(12) United States Patent
Glain

(10) Patent No.: US 12,304,638 B2
(45) Date of Patent: May 20, 2025

(54) FLEXIBLE STRUCTURE FOR CREATING A REST SPACE INSIDE AN AIRCRAFT CABIN

(71) Applicant: Safran Seats, Plaisir (FR)

(72) Inventor: Arthur K. Glain, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 18/701,720

(22) PCT Filed: Oct. 19, 2022

(86) PCT No.: PCT/EP2022/079101
§ 371 (c)(1),
(2) Date: Apr. 16, 2024

(87) PCT Pub. No.: WO2023/067000
PCT Pub. Date: Apr. 27, 2023

(65) Prior Publication Data
US 2024/0327003 A1    Oct. 3, 2024

(30) Foreign Application Priority Data

Oct. 20, 2021 (FR) ........................... 2111122

(51) Int. Cl.
*B64D 11/06* (2006.01)
(52) U.S. Cl.
CPC ...... *B64D 11/0606* (2014.12); *B64D 11/0691* (2014.12)
(58) Field of Classification Search
CPC .. B64D 11/0606; B64D 11/0691; B60N 2/60; B60N 2/6009
See application file for complete search history.

(56) References Cited

U.S. PATENT DOCUMENTS 5,690,460 A * 11/1997 Attanasio ................. F16B 5/10
411/553
2012/0112505 A1* 5/2012 Breuer ............... B64D 11/0606
244/118.6

(Continued)

FOREIGN PATENT DOCUMENTS

EP           3309072 A1    4/2018
WO      2018033599 A1    2/2018

OTHER PUBLICATIONS

International Patent Application No. PCT/EP2022/079101, International Search Report and Written Opinion, dated Jan. 30, 2023.

*Primary Examiner* — Richard Green
*Assistant Examiner* — Nevena Aleksic
(74) *Attorney, Agent, or Firm* — Kilpatrick Townsend & Stockton LLP

(57) ABSTRACT

An assembly for an aeroplane cabin includes a rear seat unit, a front seat unit, a passage for accessing an aisle way extending between the rear seat unit and the front seat unit, a removable flexible structure comprising, in a deployed state, an upper portion extending above the seat of the rear seat unit between the privacy shell of the rear seat unit and the privacy shell of the front seat unit, and a lateral portion blocking the passage for accessing the aisle way, such that the flexible structure defines, with the shell of the rear seat unit and the shell of the front seat unit, a closed rest space around the seat of the rear seat unit.

10 Claims, 8 Drawing Sheets

(56) References Cited

U.S. PATENT DOCUMENTS

| | | | | |
|---|---|---|---|---|
| 2016/0298370 A1* | 10/2016 | Druckman | .......... | E05D 15/0656 |
| 2018/0099753 A1* | 4/2018 | Hall, Jr. | ................ | B64D 11/0606 |
| 2019/0157905 A1* | 5/2019 | Zurian | .................... | H02J 50/10 |
| 2019/0210733 A1* | 7/2019 | Herault | .............. | B64D 11/0604 |
| 2021/0163139 A1 | 6/2021 | Bonnefoy et al. | | |
| 2021/0354830 A1* | 11/2021 | Straub | ................ | B64D 11/0606 |

* cited by examiner

[Fig. 1]
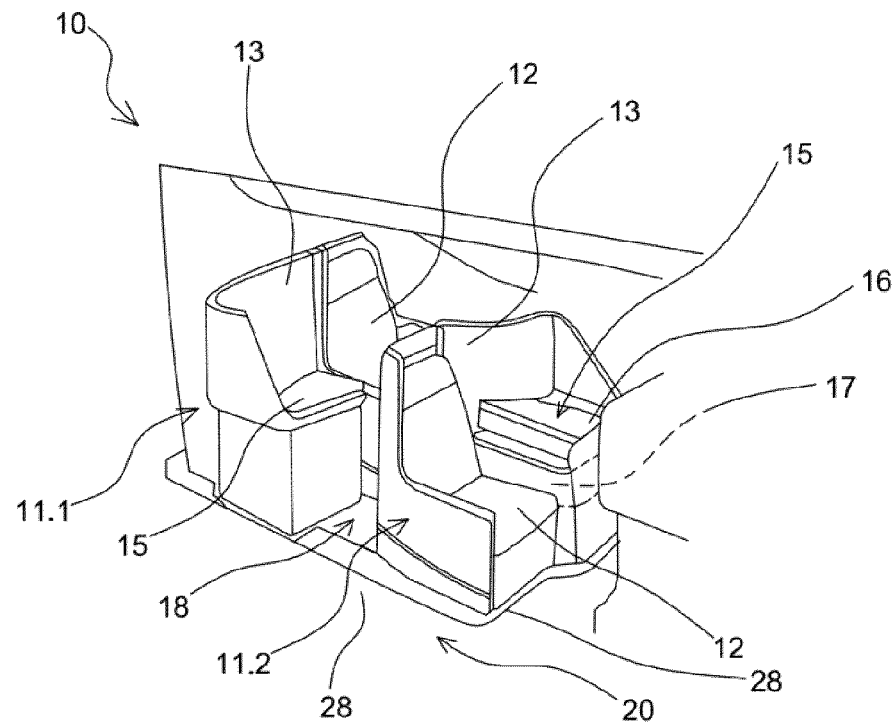
[Fig. 2]
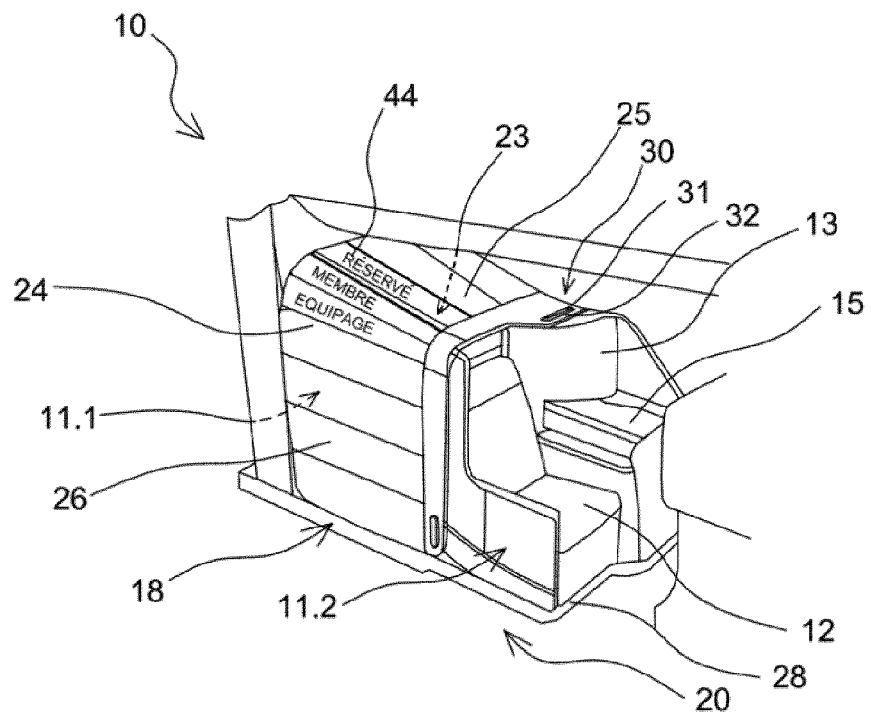

[Fig. 3]
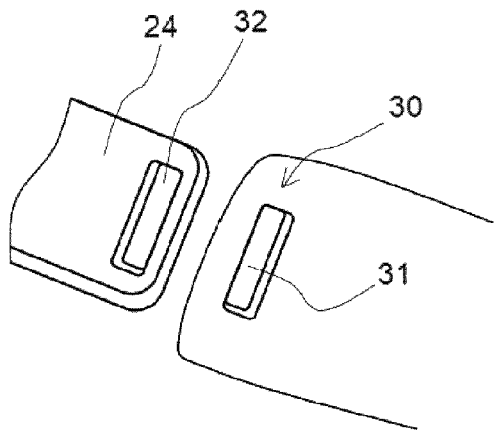
[Fig. 4]
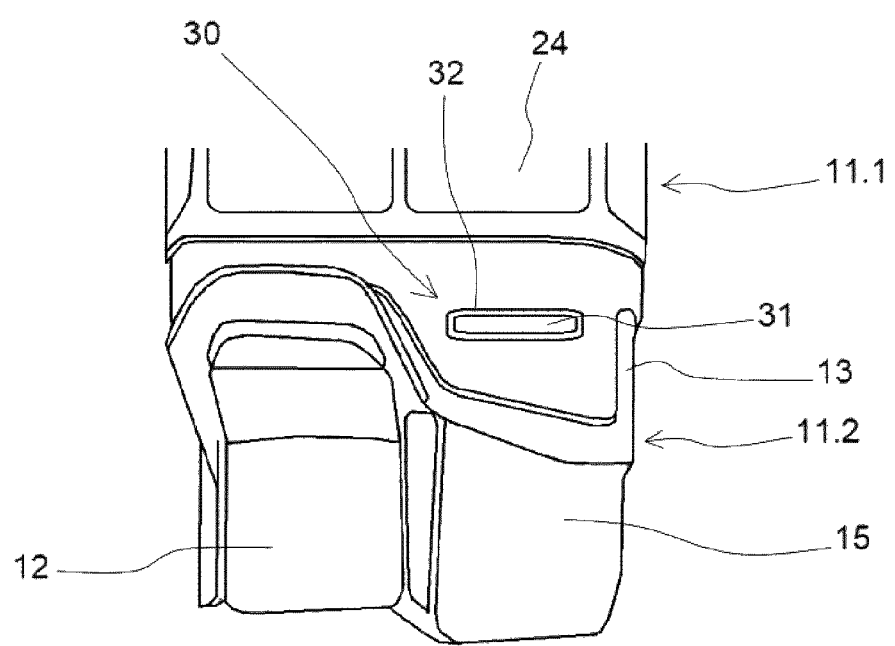

[Fig. 5a]
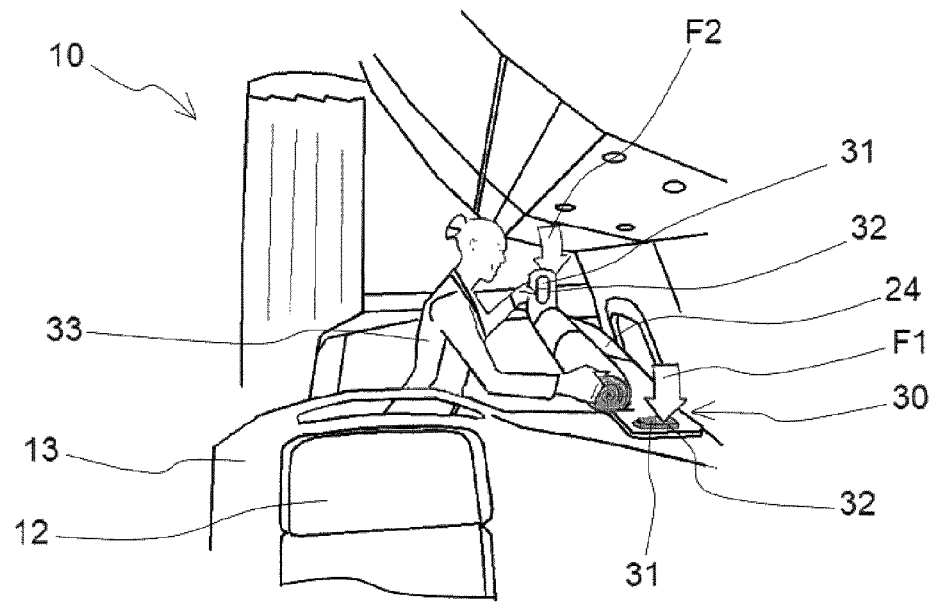
[Fig. 5b]
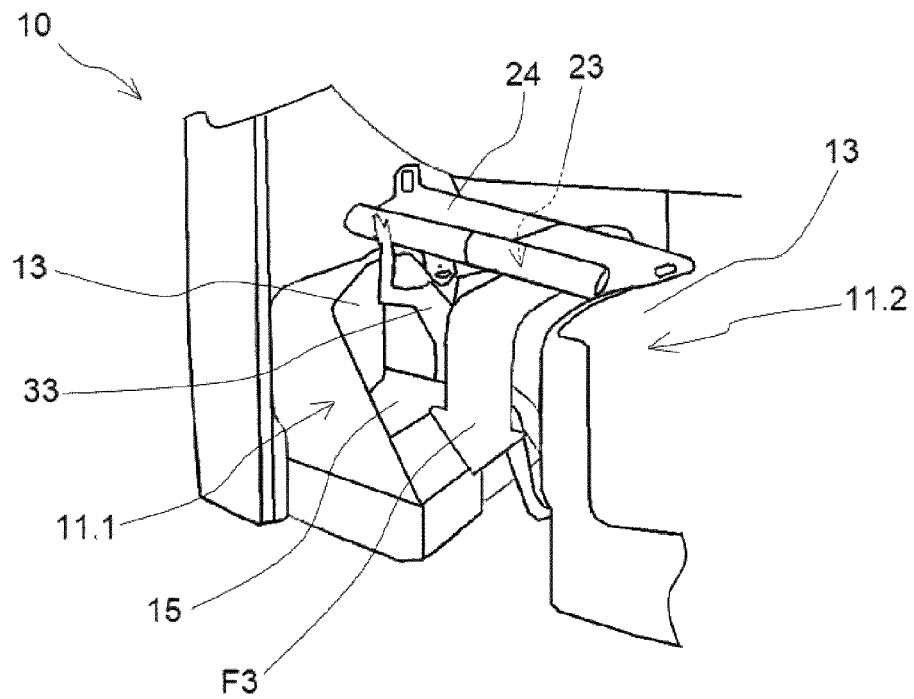

[Fig. 6]
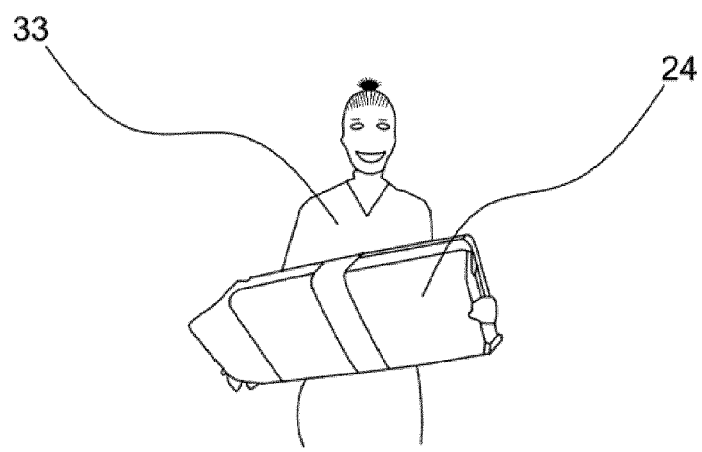
[Fig. 7]
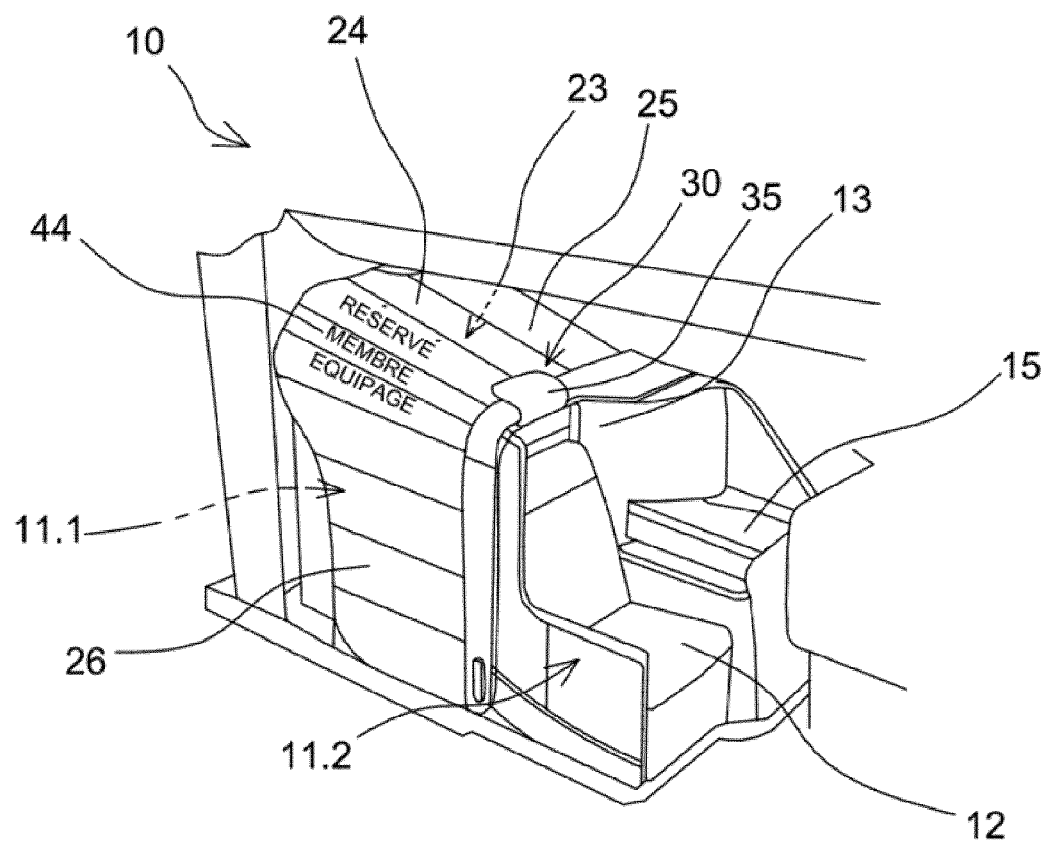

[Fig. 8]
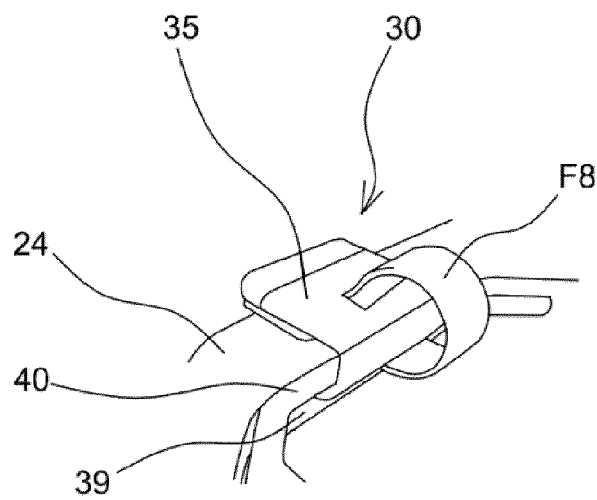
[Fig. 9]
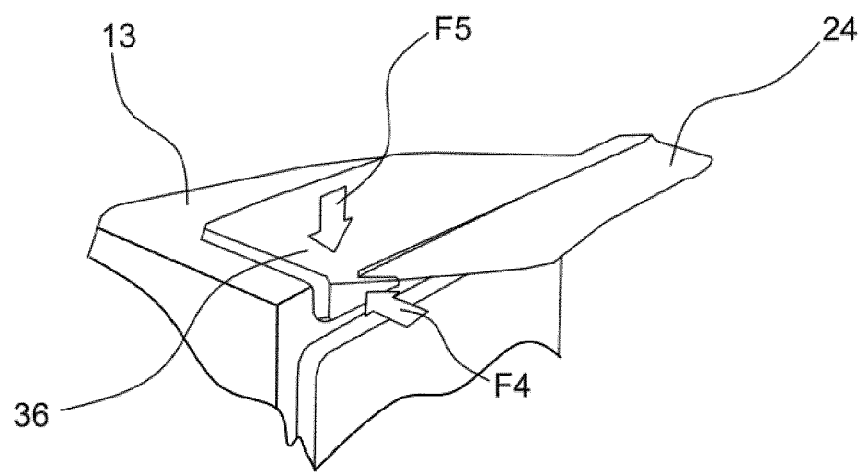

[Fig. 10]
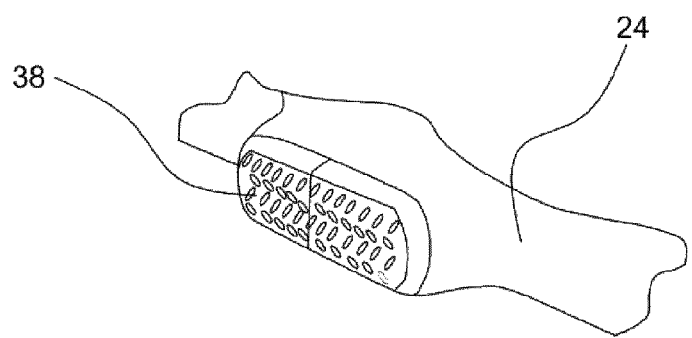
[Fig. 11a]
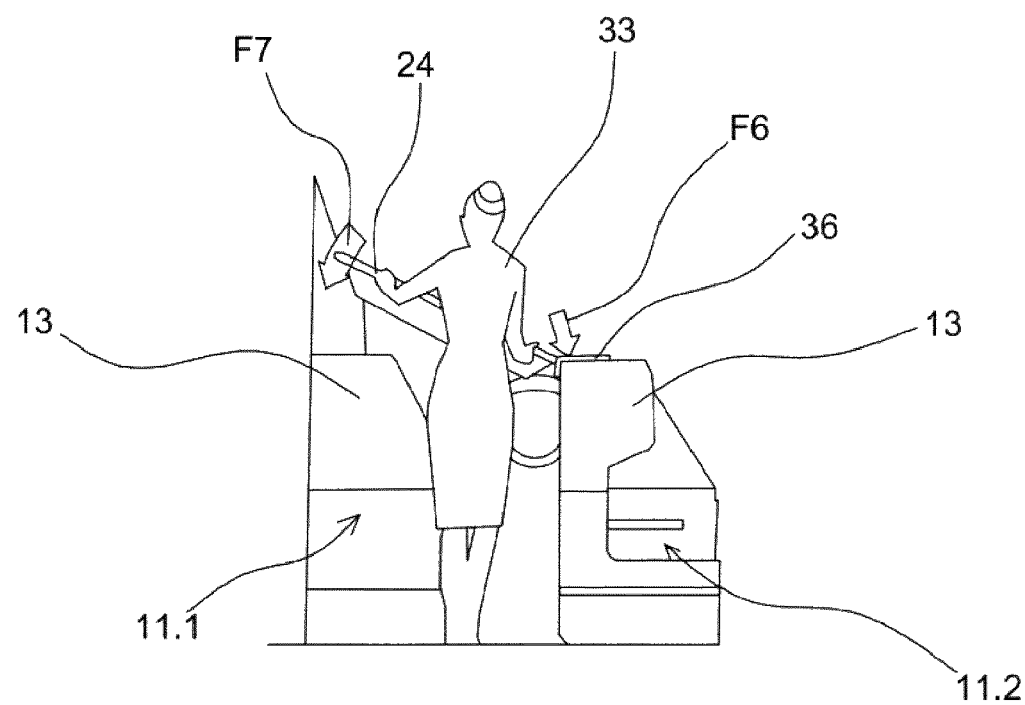

[Fig. 11b]
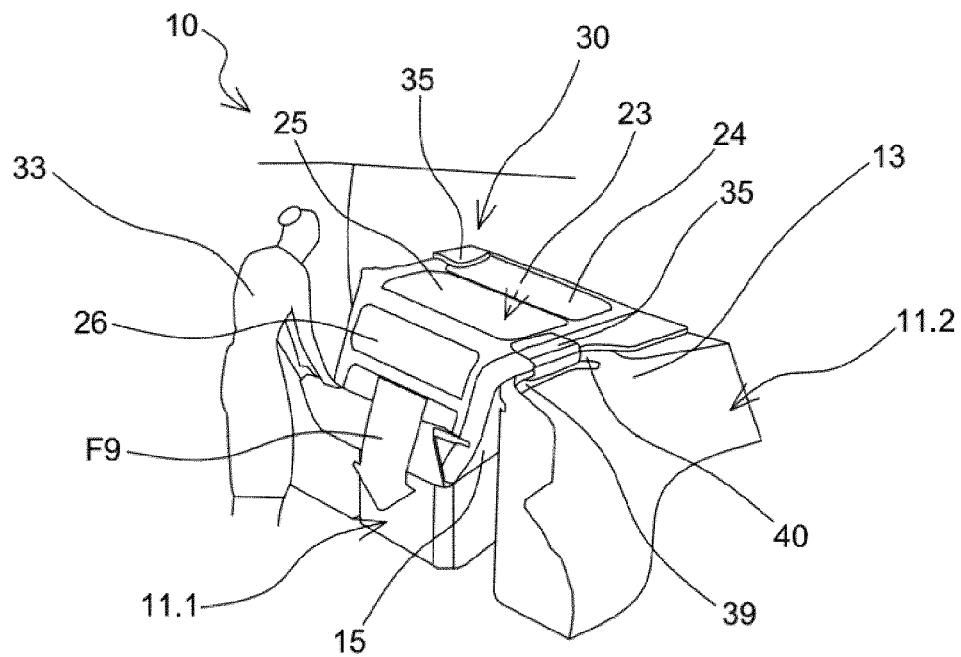
[Fig. 12]
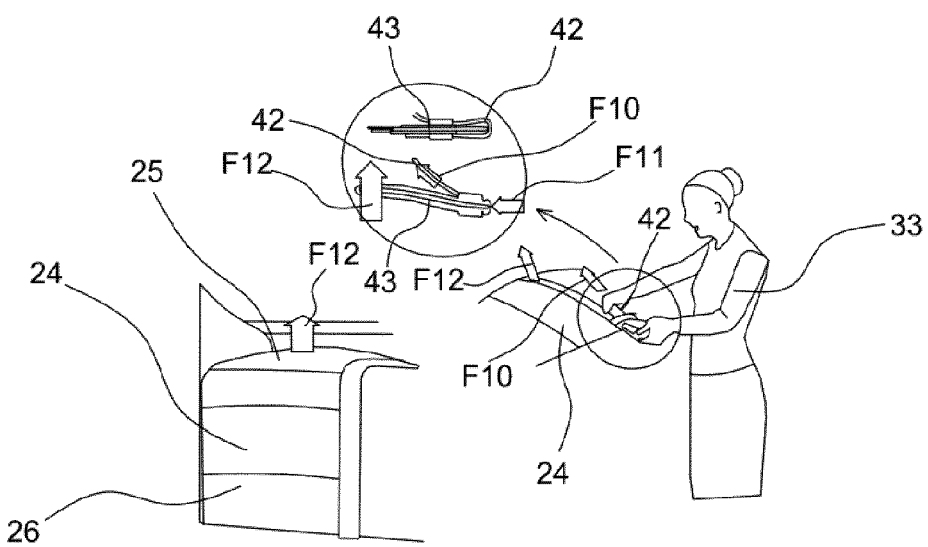

[Fig. 13]
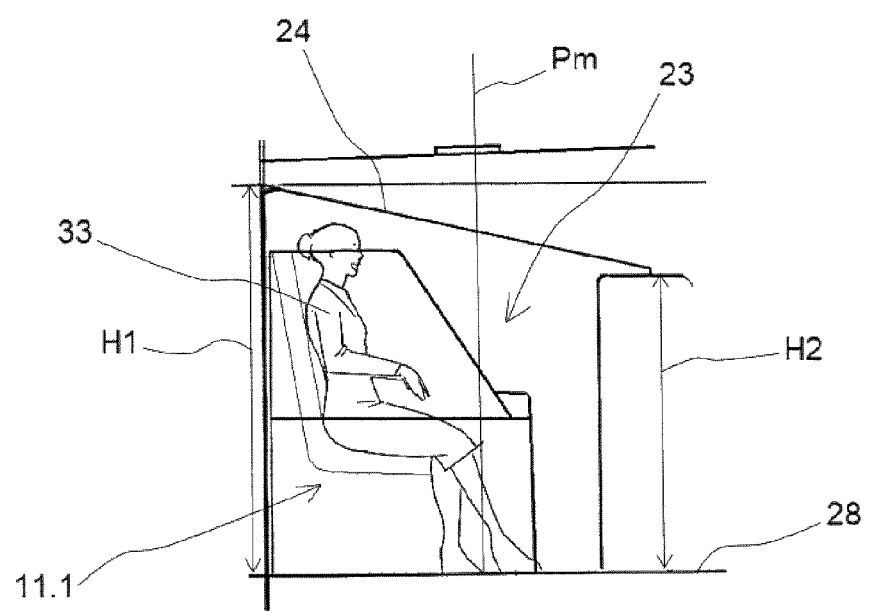

FLEXIBLE STRUCTURE FOR CREATING A REST SPACE INSIDE AN AIRCRAFT CABIN

The present invention relates to a flexible structure for creating a rest space inside an aircraft cabin, in particular an airplane cabin.

Devices are known for creating a rest space around an aircraft seat, in particular a "Business Class" seat, in order to allow crew members to rest among the passengers within the aircraft cabin.

The solutions currently used consist of stretching curtains around a Business class seat. These are a protection from other passengers during sleep phases. These curtains also are a protection from light and lack of privacy with other passengers in order to provide greater comfort and privacy for crew members.

These curtains however pose aesthetic problems as well as integration problems within the aircraft cabin. Indeed, curtains require the installation of bulky and unsightly modules, such as exposed rails which degrade the quality perceived by passengers in the cabin. Adding external rails can also pose safety issues in the event of a crash.

Furthermore, the usefulness of these curtains is not clearly communicated to passengers. This can lead passengers to question their function in the cabin. In particular, passengers may wonder if these curtains are used to hide a broken seat or form a medical tent. The curiosity of certain passengers who may be tempted to look behind the curtains is likely to disturb the rest of the crew members. This can result in embarrassing situations for both passengers and crew members.

Thus, known curtain devices do not allow crew members to sleep comfortably while being isolated from other passengers within the cabin. These systems also do not meet the qualitative criteria in terms of finish and aesthetics for a Business class cabin.

The invention aims to effectively remedy the aforementioned drawbacks by proposing an assembly for an aircraft cabin comprising:
- a rear seat unit comprising a seat and a privacy shell extending at least partly around the seat,
- a front seat unit comprising a seat and a privacy shell extending at least partly around the seat,
- an access passage to an aisle extending between the rear seat unit and the front seat unit,
- a removable flexible structure comprising, in a deployed state, an upper portion extending above the seat of the rear seat unit between the privacy shell of the rear seat unit and the privacy shell of the front seat unit, and
- a side portion extending vertically between the rear seat unit and the front seat unit to close the access passage to the aisle,
- so that the flexible structure delimits, with the shell of the rear seat unit and the shell of the front seat unit, a closed rest space around the seat of the rear seat unit.

Thanks to the use of the removable flexible structure, the invention thus allows an harmonious integration into an aircraft cabin without degrading the aesthetic appearance or the perceived quality of a business class cabin. Indeed, the invention does not require the addition of bulky and visually unsightly modules within the cabin, such as the installation of exposed rails. Additionally, when the solution is not deployed, the flexible structure can be discreetly stored in the compartment without disturbing passengers. The invention also makes it possible to improve the separation between the rest space for on crew members and the rest of the cabin. Rest conditions for crew members are therefore also improved. The invention is also economical, in that it is simple to produce and requires almost no modification to the cabin.

According to one embodiment of the invention, at least one holding device is able to hold the flexible structure on a privacy shell.

According to one embodiment of the invention, the holding device comprises at least one projecting stud in a portion of the privacy shell to be inserted into an opening in the flexible structure.

According to one embodiment of the invention, the holding device comprises a flap connected to the flexible structure, said flap being to be fixed on a portion of the privacy shell.

According to one embodiment of the invention, the flap is made of a soft plastic material.

According to one embodiment of the invention, the flap has the shape of a U so as to be able to at least partially surround a portion of the privacy shell.

According to one embodiment of the invention, the flexible structure comprises a support element for pressing against a portion of a privacy shell.

According to one embodiment of the invention, the support element has the shape of a L the angle of which is pressed against a corresponding angle of a privacy shell of a seat unit.

According to one embodiment of the invention, the flexible structure comprises at least one positioning insert for bearing against a corresponding area of a seat unit or a wall in the aircraft cabin.

According to one embodiment of the invention, the flexible structure is provided with at least one strap so as to be able to increase an internal volume of the closed rest space.

According to one embodiment of the invention, the flexible structure has an asymmetrical configuration with respect to a median transverse plane, so that a height of the flexible structure measured relative to a floor of the aircraft cabin at the privacy shell of the rear seat unit is higher than a height of the flexible structure measured relative to the floor of the aircraft cabin at the privacy shell of the front seat unit.

According to one embodiment of the invention, the flexible structure is preferably made of a flexible material, in particular a textile material.

According to one embodiment of the invention, the flexible structure is made of a padded material.

According to one embodiment of the invention, the flexible structure comprises a mark in the form of a text and/or a symbol that the flexible structure delimits a closed rest space for crew members.

According to one embodiment of the invention, the flexible structure is customizable in the colors of an airline.

The invention also relates to an aircraft cabin comprising the assembly as defined previously.

The present invention will be better understood and other characteristics and advantages will become apparent on reading the detailed following description comprising embodiments given by way of illustration with reference to the appended figures, presented by way of non-limiting examples, which may be used to complete the understanding of the present invention and the presentation of its realization and, if necessary, contribute to its definition, wherein:

FIGS. 1 and 2 are perspective views of a part of an aircraft cabin respectively before and after the installation of an attached flexible structure according to the invention allowing the creation of a closed rest space for the crew members;

FIG. 3 is a detailed perspective view of a holding device for the flexible structure provided with a projecting stud from a privacy shell for cooperating with an opening in the flexible structure;

FIG. 4 is a top view of part of the flexible structure fixed to a privacy shell of the front seat unit by means of a holding device in FIG. 3;

FIGS. 5a and 5b are perspective views illustrating the installation of a flexible structure according to the invention allowing the creation of a closed rest space for crew members;

FIG. 6 is a perspective view showing the flexible structure in the folded state in the hands of a crew member;

FIG. 7 is a perspective view of a variant embodiment of the flexible structure around a seat unit in order to create a closed rest space for crew members;

FIG. 8 is a detailed perspective view of a holding device for the flexible structure provided with a flap for fixing the flexible structure on a portion of a privacy shell of a seat unit;

FIG. 9 is a detailed perspective view of a support element in one edge of the flexible structure ensuring indexing in position of the flexible structure relative to a privacy shell of a seat unit;

FIG. 10 is a detailed perspective view of a positioning insert that can be provided in the flexible structure;

FIGS. 11a and 11b are perspective views illustrating the implementation of the embodiment of the flexible structure according to the invention with flaps for creating a closed rest space for the crew members;

FIG. 12 illustrates the use of straps for increasing a volume of the rest space delimited by the flexible structure;

FIG. 13 is a perspective view of an embodiment of a closed rest space having an asymmetrical configuration.

It should be noted that in the figures the structural and/or functional elements common to the different embodiments may have the same references. Thus, unless otherwise stated, such elements have identical structural, dimensional and material properties.

Furthermore, relative terms such as "front", "rear", "upper", "lower" are understood by reference to the common sense of a person on a seat around which the flexible structure according to the invention is deployed to form a closed rest space.

FIG. 1 shows an airplane cabin 10 comprising a plurality of seat units 11.1, 11.2 for example of the business class type. Conventionally, the aircraft cabin 10 has several columns of seat units 11.1, 11.2 behind one another. Two seat units 11.1, 11.2 are however shown in the figure in order to facilitate understanding of the invention.

There is a rear seat unit 11.1 comprising a seat 12 and a privacy shell 13 extending at least partly around the seat 12, and a front seat unit 11.2 comprising a seat 12 and a privacy shell 13 extending at least partly around the seat 12. A privacy shell 13 thus makes it possible to isolate the passenger of the corresponding seat unit 11.1, 11.2 from the external environment.

A seat 12 can offer a passenger different comfort positions, from a "seating" position to a "bed" position, in which the seat 12 defines a substantially horizontal sleeping surface so that the passenger can lie down. Intermediate comfort positions are also offered, such as the "relax" position in which a back of the seat 12 is strongly inclined. Generally, these intermediate positions are obtained by the inclination of the pivoting backrest around a horizontal axis and perpendicular to an axis of extension of the seat 12. The passenger can remain on the seat 12 during transitions between the different positions.

A seat unit 11.1, 11.2 may also include a side cabinet 15 having an upper face 16 on which the passenger can place objects. The side cabinet 15 may be provided with a foot housing 17 for receiving the feet of a passenger of a corresponding rear seat 12, in particular when the rear seat 12 is in the "bed" position. Thus, the opening of the leg housing 17 is directed towards the seat 12 immediately behind the cabinet 15 of the seat unit.

An access passage 18 to an aisle 20 extends between the rear seat unit 11.1 and the front seat unit 11.2. This access passage 18 allows the passenger in the rear seat unit 11.1 to have access to the aisle 20.

In order to create a closed rest space 23 around the rear seat unit 11.1, a flexible structure 24 is used which is attached to the seat units 11.1, 11.2, as shown in FIG. 2. The flexible structure 24 comprises in a deployed state an upper portion 25 extending above the seat 12 of the rear seat unit 11.1 between the privacy shell 13 of the rear seat unit 11.1 and the privacy shell 13 of the front seat unit 11.2. The flexible structure 24 also includes a side portion 26 extending vertically between the rear seat unit 11.1 and the front seat unit 11.2 for closing the access passage to the aisle. Thus, the removable flexible structure 24 delimits with the privacy shell 13 of the rear seat unit 11.1 and the privacy shell 13 of the front seat unit 11.2 a closed rest space 23 around the seat 12 of the rear seat unit 11.1.

In the example shown, the upper portion 25 may extend mainly in a horizontal plane relative to the floor 28 of the aircraft cabin. Alternatively, the upper portion 25 may extend in a plane forming a non-zero angle with respect to the floor 28. The angle of the plane in which the upper portion 25 extends with respect to the floor 28 may be a few degrees, notably between 0 and 30 degrees. The side portion 26 extends mainly in a plane perpendicular to the floor 28. The side portion 26 is preferably made in one piece with the upper portion 25. The flexible structure 24 is thus made in one piece.

The flexible structure 24 is preferably made of a textile material. The flexible structure 24 could be made of a padded or quilted material. Such a configuration makes it possible to better isolate from noise and light and thus improve the comfort of the crew members. The textile material can be uniformly pleated to minimize unsightly creases in the curtain caused by storage. The flexible structure 24 may take the form of a deformable panel.

The flexible structure 24 may include a mark 44 in the form of a text and/or a symbol indicating that the curtain delimits a closed rest space 23 for crew members, as shown in FIGS. 2 and 7. This helps clarify its usefulness to passengers. Advantageously, the flexible structure 24 can be customized with the airline colors.

At least one holding device 30 is able to hold the flexible structure 24 to a privacy shell 13 of at least one seat unit 11.1, 11.2. As can be seen in FIGS. 3 and 4, the holding device 30 comprises at least one protruding stud 31 formed in a portion of the privacy shell 13 and to be inserted into an opening 32 in the removable flexible structure 24. Alternatively, the protruding stud 31 could be replaced with a hook for cooperating with the opening g 32 in the removable flexible structure 24. Alternatively, the holding device 30 comprises magnets integrated flexible into the structure 24 for cooperating with metallic or magnetic elements integrated into a seat unit 11.1, 11.2, or vice versa. Alternatively, the removable holding device 30 comprises self-gripping fasteners in the flexible structure 24 for cooperating with self-gripping fasteners of corresponding shape in a seat unit 11.1, 11.2. The self-gripping fasteners could for example be Velcro-type fasteners (registered trademark).

The installation of the flexible structure 24 for creating a closed rest space 23 around the seat 12 of the rear seat unit 11.1 is described below, with reference to FIGS. 5a and 5b. For this purpose, a front edge of the flexible structure 24 is fixed to the shell of the front seat unit 11.2 by inserting at least one stud 31 into a corresponding opening 32 in the flexible structure 24. For this purpose, a crew member 33 will be able to press on the flexible structure according to the arrow F1 in order to make the stud 31 penetrate into the corresponding opening 32, as shown in FIG. 5a.

The rear edge of the flexible structure 24 could also be connected to the shell of the rear seat 12 and/or to a wall of the airplane cabin 10 by means of a similar device provided with a projecting stud 31 and a corresponding opening 32 in the flexible structure 24. The crew member 33 will thus be able to position the rear edge of the flexible structure 24 according to arrow F2.

The crew member 33 then just needs to gradually unfold the flexible structure 24 above the rear seat unit 11.1 according to the arrow F3, so that the flexible structure 24 closes the closed rest space 23 via the upper portion 25 and the side portion 26.

As illustrated in FIG. 6, once the flexible structure 24 is disengaged from the studs 31, the flexible structure 24 can be folded and stored easily and compactly inside a space of the plane for this purpose. This storage space could for example be a space in a cabinet or in a luggage compartment.

In the embodiment in FIG. 7, the holding device 30 of the flexible structure 24 comprises a flap 35 connected to the flexible structure 24. The flap 35 clearly visible in FIG. 8 is intended to be fixed on a portion of a privacy shell 13. The flap 35 may be made of a stiffer material than the rest of the curtain. The flap 35 is advantageously made of a deformable flexible plastic material, or rubber, or any other material suitable for the application. The flap 35 has the shape of a U so as to be able to at least partially surround a portion of the privacy shell 13.

As can be seen in FIG. 9, the flexible structure 24 can also include at least one support element 36 for pressing against a portion of a privacy shell 13. The support element 36 thus makes it possible to guarantee correct indexing in position of the flexible structure 24 in relation to a privacy shell 13. The support element 36 has the shape of a L whose angle is pressed, according to arrows F4 and F5, against a corresponding angle of a portion of a privacy shell 13 of a seat unit. The support element 36 may be provided in an edge of the flexible structure 24. The support element 36 may be formed by a stiffened portion of an edge of the flexible structure 24.

As illustrated in FIG. 10, it is also possible to use one or more positioning inserts 38, in particular of elongated shape, made of an elastic material. The positioning inserts 38 are for example made of rubber. Wen bearing against a corresponding zone of a privacy shell 13 or a wall of the aircraft cabin 10, these positioning inserts 38 also contribute to the correct positioning as well as to the holding of the flexible structure 24 so as to form the closed rest space 23.

The installation of the flexible structure 24 provided with flaps 35 for creating a closed rest space 23 around the seat 12 of the rear seat unit 11.1 is described below, with reference to FIGS. 11a and 11b.

First of all, the support element 36 from the front edge of the flexible structure 24 is pressed according to the arrow F6 against a corresponding shape of the shell of the front seat 12. The opposite edge of the flexible structure 24 is placed according to the arrow F7.

The flap 35 is then placed in order to attach the flexible structure 24 to the privacy shell 13 of the front seat unit 11.2. For this purpose, as shown in FIG. 8, the flap 35 is inserted via a free end into an opening 39 delimited by a longitudinal portion 40 and the rest of the privacy shell 13 of the front seat unit 11.2. The flap 35 is then turned according to the arrow F8 so that the U shape partially surrounds the portion 40 of the privacy shell 13. A similar flap 35 connected to a rear edge of the flexible structure 24 can also be attached to the privacy shell 13 of the rear seat unit 11.1.

As shown in FIG. 11b, the crew member 33 then just needs to gradually unfold the flexible structure 24 above the rear seat unit 11.1 according to the arrow F9, so that the flexible structure 24 closes the rest space 23 via the upper portion 25 and the side portion 26.

The rubber inserts 38 could make it possible to improve the positioning and holding of the flexible structure 24.

Once the flaps 35 are detached from the privacy shells 13, the flexible structure 24 can be folded and stored easily and compactly inside a space in the aircraft provided for this purpose, such as for example a space in a cabinet or a luggage compartment.

In order to improve the ergonomics and comfort of the crew members, the flexible structure 24 may be provided with a strap 42 shown in FIG. 12. A structural portion 43 linked to the flexible structure 24 is arranged partly inside a U-shaped space delimited by the strap 42. When pulling on one end of the strap 42 according to the arrow F10, the bottom of the U of the strap 42 pushes the structural portion 43 into the closed rest space 23 according to the arrow F11. This has the effect of deforming the flexible structure 24 upwards according to the arrow F12 so as to increase a volume of the closed rest space 23.

As illustrated in FIG. 13, the flexible structure 24 can present an asymmetrical configuration with respect to a median transverse plane Pm so that a height H1 of the flexible structure 24 measured relative to the floor 28 of the aircraft cabin 10 at the privacy shell 13 of the rear seat unit 11.1 is greater than a height H2 of the flexible structure 24 measured relative to the floor 28 at the privacy shell 13 of the front seat unit 11.2.

Of course, the different characteristics, variants and/or forms of embodiment of the present invention can be associated with each other in various combinations to the extent that they are not incompatible with one another or exclusive from one another.

Furthermore, the invention is not limited to the embodiments described above and provided solely by way of example. It encompasses various modifications, alternative forms and other variants that those skilled in the art may consider in the context of the present invention and in particular all combinations of the different modes of operation described above, which can be taken separately or in combination.

The invention claimed is:

1. An assembly for an aircraft cabin comprising:
 a rear seat unit comprising a seat and a privacy shell extending at least partly around the seat,
 a front seat unit comprising a seat and a privacy shell extending at least partly around the seat,
 an access passage to an aisle extending between the rear seat unit and the front seat unit, wherein a removable flexible structure comprises, in a deployed state, an upper portion extending above the seat of the rear seat unit from the privacy shell of the rear seat unit to the privacy shell of the front seat unit, and a side portion extending vertically between the rear seat unit and the front seat unit in order to close the access passage to the aisle, so that the flexible structure delimits, with the shell of the rear seat unit and the shell of the front seat unit, a closed rest space around of the seat of the rear seat unit, wherein the removable flexible structure is made in one piece, wherein when the removable flexible structure is in a undeployed state, the removable flexible structure can be folded and stored easily and compactly inside a space of the aircraft cabin for this purpose, and wherein the flexible structure has an asymmetrical configuration relative to a median transverse plane, so that a height of the flexible structure measured relative to a floor at the privacy shell of the rear seat unit is greater than a height of the flexible structure measured relative to the floor at the privacy shell of the front seat unit.

2. The assembly according to claim 1, wherein at least one holding device is able to hold the flexible structure on a privacy shell.

3. The assembly according to claim 2, wherein the holding device comprises at least one projecting stud formed in a portion of the privacy shell to be inserted into an opening in the flexible structure.

4. The assembly according to claim 2, wherein the holding device comprises a flap connected to the flexible structure, said flap being fixed on a portion of the privacy shell.

5. The assembly according to claim 4, wherein the flap has the shape of a U so as to be able to surround at least partially a portion of the privacy shell.

6. The assembly according to claim 1, wherein the flexible structure comprises a support element for pressing against a portion of a privacy shell.

7. The assembly according to claim 1, wherein the flexible structure comprises at least one positioning insert for bearing against a corresponding zone of a seat unit or a wall of the aircraft cabin.

8. The assembly according to claim 1, wherein the flexible structure is provided with at least one strap so as to be able to increase an internal volume of the enclosed closed rest space.

9. The assembly according to claim 1, wherein the flexible structure comprises a mark in the form of a text and/or a symbol indicating that the flexible structure delimits the closed rest space for crew members.

10. The assembly according to claim 1, wherein the upper portion of the removable flexible structure extends from one lateral side of the seat to an opposite lateral side of the seat.

* * * * *